United States Patent
Yamamori

(10) Patent No.: US 9,608,888 B2
(45) Date of Patent: Mar. 28, 2017

(54) TRANSMITTING DEVICE, METHOD FOR MONITORING MEMORY, AND TRANSMISSION SYSTEM

(71) Applicant: FUJITSU LIMITED, Kawasaki-shi, Kanagawa (JP)

(72) Inventor: Yasuhiro Yamamori, Hakusan (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 13/970,468

(22) Filed: Aug. 19, 2013

(65) Prior Publication Data

US 2014/0086067 A1    Mar. 27, 2014

(30) Foreign Application Priority Data

Sep. 24, 2012  (JP) ................. 2012-210140

(51) Int. Cl.
| | |
|---|---|
| *H04L 12/26* | (2006.01) |
| *H04L 12/939* | (2013.01) |
| *H04L 12/935* | (2013.01) |
| *H04L 12/46* | (2006.01) |

(52) U.S. Cl.
CPC .......... *H04L 43/0823* (2013.01); *H04L 49/30* (2013.01); *H04L 49/555* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 8,149,730 B1* | 4/2012 | Aybay ............... | H04L 12/2697 370/253 |
| 2005/0213504 A1* | 9/2005 | Enomoto et al. ............ | 370/235 |
| 2007/0076694 A1* | 4/2007 | Iyer et al. ..................... | 370/352 |
| 2008/0062874 A1* | 3/2008 | Shimadoi ..................... | 370/232 |
| 2009/0190600 A1* | 7/2009 | Akahane ....................... | 370/400 |
| 2012/0039337 A1* | 2/2012 | Jackowski et al. ........... | 370/392 |

FOREIGN PATENT DOCUMENTS

| | | |
|---|---|---|
| JP | 63-284941 | 11/1988 |
| JP | 2005-269507 | 9/2005 |

* cited by examiner

*Primary Examiner* — Huy D Vu
*Assistant Examiner* — Hong Shao
(74) *Attorney, Agent, or Firm* — Staas & Halsey LLP

(57) ABSTRACT

A transmitting device includes a memory configured to store information items that indicate whether a packet transmitted through a network is distributed in an input and output device for each of identifiers identifying networks; and a processor coupled to the memory and configured to select, from among the identifiers based on the information items, a selected identifier identifying a network through which the packet is distributed in the input and output device a distributed number of times that is smaller than a predetermined value, generate a monitoring packet to be transmitted through the network identified by the selected identifier, access an entry associated with the network identified by the selected identifier and included in the memory, and detect an error of data in the memory when the monitoring packet is distributed in the input and output device.

11 Claims, 11 Drawing Sheets

FIG. 3

| NUMBER OF INPUT PACKETS | NUMBER OF OUTPUT PACKETS | TOTAL NUMBER OF PACKETS |
|---|---|---|
| 150 | 185 | 335 |

TRANSMITTING DEVICE, METHOD FOR MONITORING MEMORY, AND TRANSMISSION SYSTEM

CROSS-REFERENCE TO RELATED APPLICATION

This application is based upon and claims the benefit of priority of the prior Japanese Patent Application No. 2012-210140, filed on Sep. 24, 2012, the entire contents of which are incorporated herein by reference.

FIELD

The embodiments discussed herein are related to a transmitting device, a method for monitoring a memory, and a transmission system.

BACKGROUND

A memory that is arranged in a line interface unit (LIU) has an error detection circuit that detects an error using an error correcting code (ECC), a parity, a frame check sequence (FCS), or the like. The LIU uses the error detection circuit to detect an error of data in the memory when receiving a packet.

The reliability of a recent transmitting device is improved by causing the LIU to be made redundant and thereby inhibiting communication from being stopped even if a failure occurs in the LIU. When the LIU is made redundant, a user packet or the like is input to the error detection circuit of the operating LIU, and the operating LIU may detect an error of data in the memory. On the other hand, the user packet or the like is not input to an error detection circuit of a standby LIU, and it is difficult for the standby LIU to detect an error of data in a memory.

Thus, even if an abnormality occurs in the memory of the standby LIU, the error of data in the memory is not detected until the transmitting device switches the operating LIU to a standby state. The error of data in the memory is detected when the operating LIU is switched from an operating state to the standby state. In addition, the standby LIU may not be used. Thus, a method is known, which is to detect an error of data in the memory by causing the operating LIU and the standby LIU to generate monitoring packets that are different from the user packet, and distributing the generated monitoring packets in the LIUs.

Specifically, the LIUs generate the monitoring packets having the highest priority set thereto so as to inhibit the generated monitoring packets from being discarded during the distributions. Subsequently, the LIUs execute reading or writing from or in the memories and distribute the generated monitoring packets. Then, the LIUs use the error detection circuits to detect an error of data in the memories when executing the reading or writing. Entries that are included in the memories and from or in which data is read or written vary depending on the type of the packet.

As related art, Japanese Laid-open Patent Publications Nos. 63-284941, 2005-269507 and the like have been disclosed.

SUMMARY

According to an aspect of the invention, a transmitting device includes a memory configured to store information items that indicate whether a packet transmitted through a network is distributed in an input and output device for each of identifiers identifying networks; and a processor coupled to the memory and configured to select, from among the identifiers based on the information items, a selected identifier identifying a network through which the packet is distributed in the input and output device a distributed number of times that is smaller than a predetermined value, generate a monitoring packet to be transmitted through the network identified by the selected identifier, access an entry associated with the network identified by the selected identifier and included in the memory, and detect an error of data in the memory when the monitoring packet is distributed in the input and output device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a distributed packet number table;

DESCRIPTION OF EMBODIMENTS

In a method for generating monitoring packets that are different from a user packet by an operating LIU and a standby LIU and distributing the monitoring packets in the LIUs, the monitoring packets are distributed using the same entry within each of memories. Thus, there is a problem that whether or not an abnormality exists in only the same location within each of the memories is checked and it is not efficient.

In general, monitoring packets that are of the same type and have the same priority are periodically distributed in the LIUs in consideration of user friendliness. Thus, the same location within each of the memories periodically continues to be monitored, and the overall memories may not be monitored.

It is considered that a type and a priority that are to be set to a monitoring packet are changed for each of monitoring packets. A monitoring packet with a low priority, however, may be discarded depending on the amount of user packets distributed in the LIUs, and the overall memories may not be monitored. Even when a type is changed for each of the monitoring packets, the types of packets distributed in the LIUs may be biased, and as a result, only a part of the memories may be monitored. If a type and a priority are changed for each of monitoring packets by an operation of an administrator or the like, a workload is large. It is, therefore, not practical to change a type and a priority for each of the monitoring packets.

Hereinafter, the embodiments of a transmission device, a method for monitoring a memory, and a transmission system, which are disclosed herein, are described with reference to the accompanying drawings. The transmission device, the method for monitoring a memory, and the transmission system are not limited to the embodiments.

First Embodiment

Overall Configuration

Figure 1:
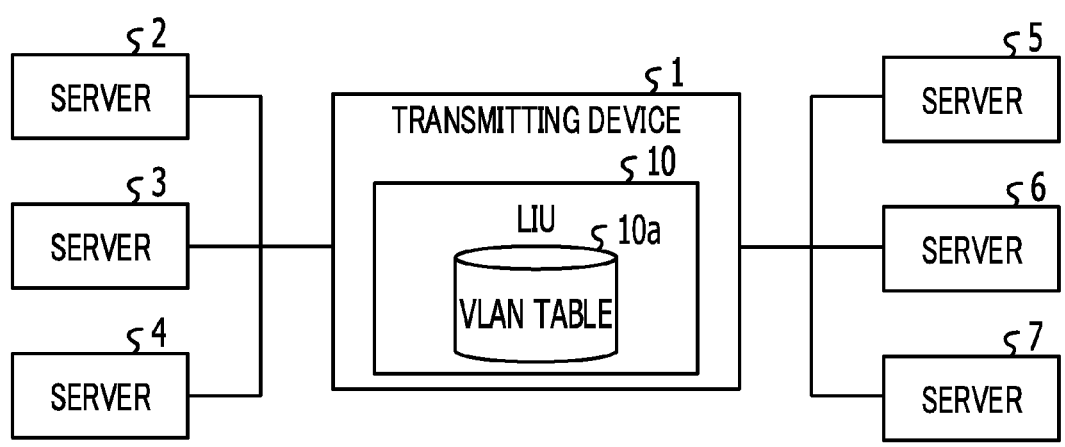
FIG. 1 is a diagram illustrating an example of an overall configuration of a transmission system that includes a transmitting device according to the first embodiment.

FIG. 1 is a diagram illustrating an overall configuration of a transmission system that includes a transmitting device 1 according to the first embodiment. As illustrated in FIG. 1, the transmission system includes the transmitting device 1 and a plurality of servers 2, 3, 4, 5, 6 and 7. The transmitting device 1 and the servers 2 to 7 form a physical network and virtual networks within the physical network. The network of the transmission system is divided by at least one virtual network. For example, the servers 2 and 5 are coupled to each other by a virtual network. The transmitting device 1 relays a packet received from the server 2 to the server 5.

The virtual networks are identified by unique virtual identifiers. The configuration illustrated in FIG. 1 is an example and not limited to this. For example, the transmission system may include another device such as a router or a user terminal. The number of devices is not limited to the number of the devices illustrated in FIG. 1.

The transmitting device 1 has a line interface unit (LIU) 10. The LIU 10 is a device that transfers packets between the servers 2 to 7. The LIU 10 has a virtual local area network (VLAN) table 10a and detects an error of data in a memory. The VLAN table 10a is mapped to a predetermined region of the memory included in the LIU 10.

For example, when the LIU 10 receives a user packet from the server 5, the LIU 10 specifies a VLAN ID included in the user packet. Then, the LIU 10 reads, from the VLAN table 10a, a record corresponding to the specified VLAN ID included in the user packet. Specifically, the LIU 10 accesses an entry included in the memory and corresponding to the specified VLAN ID included in the user packet. In this case, the LIU 10 uses an error detection circuit included in the memory to execute a parity check or the like and thereby determines whether or not an abnormality exists in the memory. In this manner, the LIU 10 detects an error of data in the memory when receiving the user packet and accessing the memory.

The LIU 10 has a record storage unit that stores information indicating whether or not a packet that is received or transmitted through a virtual network is distributed in the LIU 10 for each of VLAN IDs identifying the virtual networks formed in the physical network. The LIU 10 selects, from among the VLAN IDs stored in the record storage unit, a VLAN ID that identifies a virtual network through which a packet is not distributed in the LIU 10. The LIU 10 generates a monitoring packet to be transmitted and received through the virtual network identified by the selected VLAN ID. After that, the LIU 10 accesses an entry included in the memory and associated with the selected virtual network and detects an error of data in the memory when distributing the generated monitoring packet in the LIU 10.

In this manner, the LIU 10 checks whether or not an abnormality exists in the memory when receiving a user packet. In this method, however, the abnormality detection is executed on only a region included in the memory and corresponding to a VLAN ID specified by the user packet. Thus, the LIU 10 monitors the state of a packet distribution for each of the VLAN IDs and generates a monitoring packet that will pass through a virtual network through which a packet is not confirmed to be distributed. Then, the LIU 10 causes the generated monitoring packet to be distributed in the LIU 10 using the region included in the memory and corresponding to the VLAN ID of the virtual network through which the packet is not confirmed to be distributed. Thus, LIU 10 may distribute entries to be monitored and thereby efficiently monitor the memory.

Functional Configuration

Figure 2:
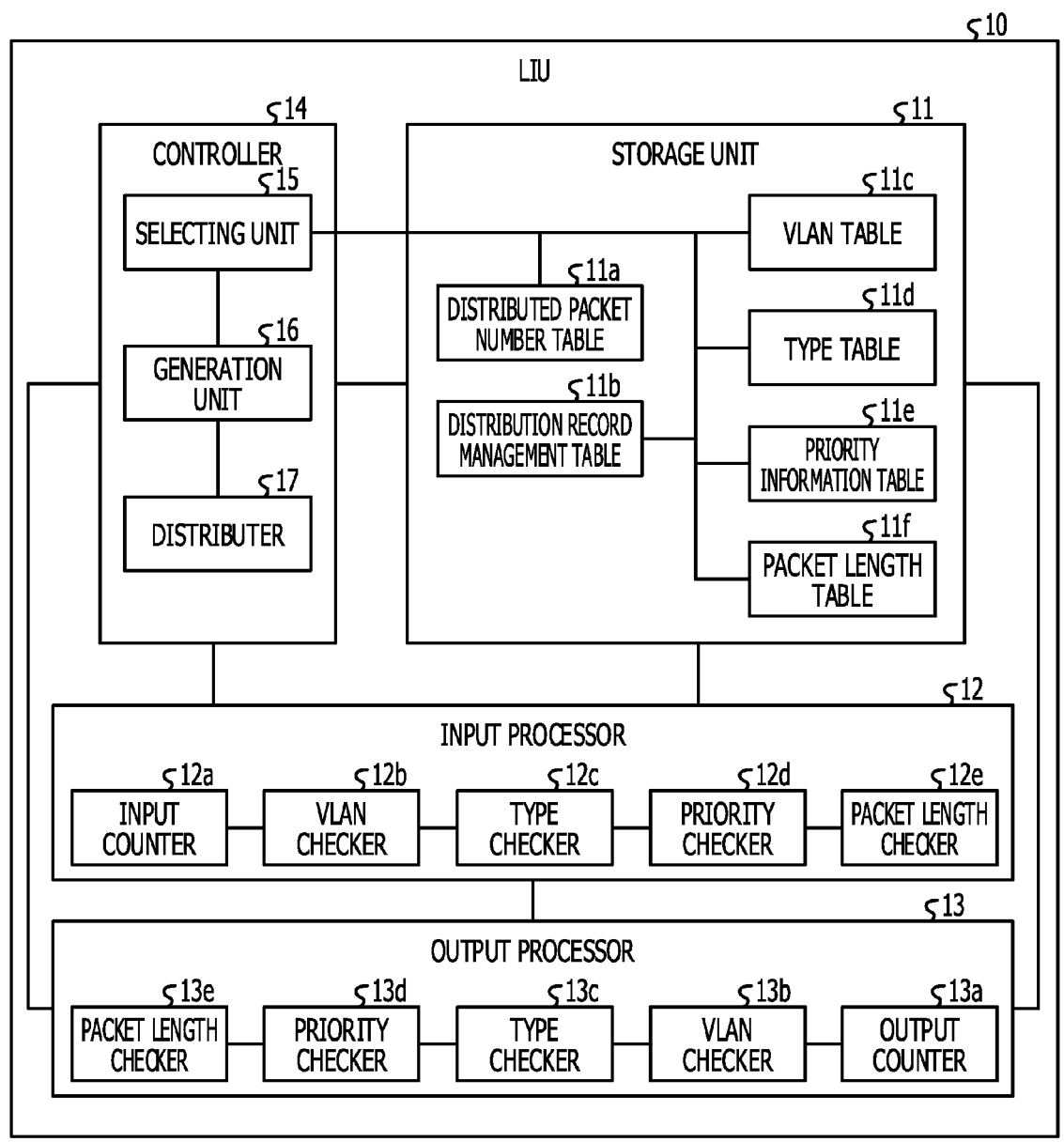
FIG. 2 is a functional block diagram illustrating a functional configuration of an LIU according to the first embodiment.

FIG. 2 is a functional block diagram illustrating a functional configuration of the LIU 10 according to the first embodiment. As illustrated in FIG. 2, the LIU 10 includes a storage unit 11, an input processor 12, an output processor 13, and a controller 14. The storage unit 11 is a memory such as a semiconductor element, for example. The controller 14 is a processor such as a central processing unit (CPU), for example.

The storage unit 11 includes a distributed packet number table 11a, a distribution record management table 11b, a VLAN table 11c, a type table 11d, a priority information table 11e, and a packet length table 11f.

The distributed packet number table 11a stores the total number of packets distributed in the LIU 10. Specifically, the distributed packet number table 11a stores the sum of the number of packets received by the LIU 10 and the number of packets transmitted by the LIU 10. The distributed packet number table 11a is updated by an input counter 12a of the input processor 12 and an output counter 13a of the output processor 13. FIG. 3 is a diagram illustrating an example of the information stored in the distributed packet number table 11a.

As illustrated in FIG. 3, the distributed packet number table 11a stores the "number of input packets", the "number of output packets", and the "total number of packets". The "number of input packets" is the number of packets received by the LIU 10 and updated by the input counter 12a. The "number of output packets" is the number of packets transmitted by the LIU 10 and updated by the output counter 13a. The "total number of packets" is the sum of the number of the input packets and the number of the output packets and updated by the input or output counter 12a or 13a that has updated the "number of the input packets" or the "number of the output packets". FIG. 3 illustrates the case where the LIU 10 receives 150 packets, transmits 185 packets, and thereby processes the 335 packets.

Figure 4:
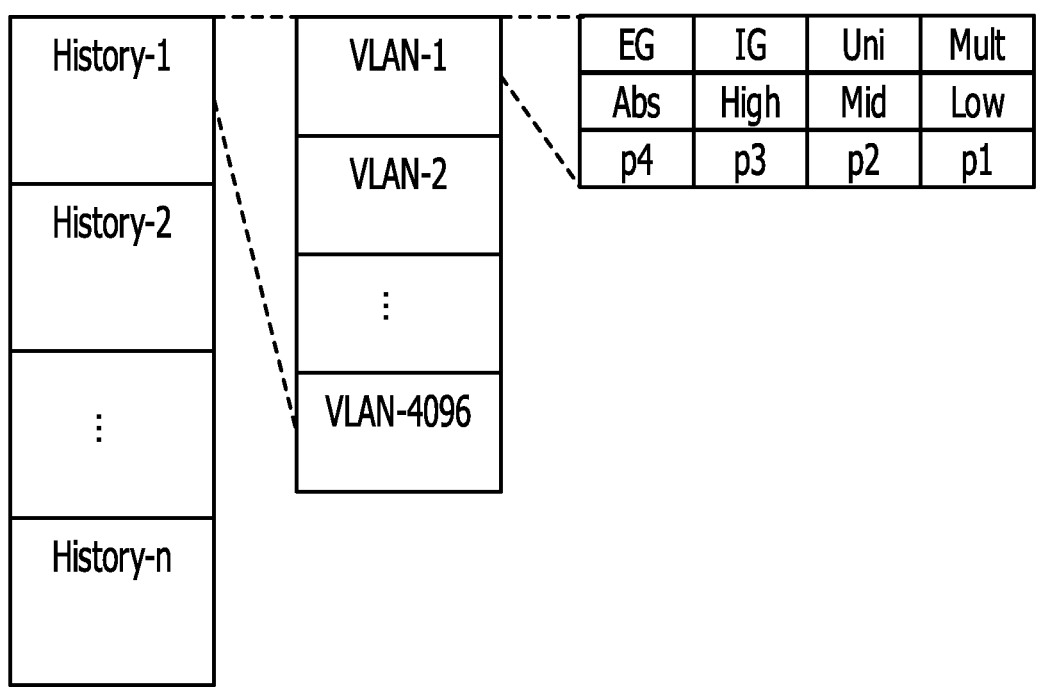
FIG. 4 is a diagram illustrating an example of information stored in a distribution record management table.

The distribution record management table 11b is used to manage records of packets distributed in the LIU 10. The information that is stored in the distribution record management table 11b is updated by checkers 12a to 12e and 13a to 13e included in the input and output processors 12 and 13. FIG. 4 is a diagram illustrating an example of the information stored in the distribution record management table 11b.

As illustrated in FIG. 4, the distribution record management table 11b stores VLAN IDs "VLAN-1" to "VLAN-4096" for each of identifiers "History-1" to "History-n" (n is an arbitrary integer). The distribution record management table 11b stores flags "EG, IG, Uni, Mult, Abs, High, Mid, Low, p4, p3, p2, and p1" for each of the VLAN IDs.

The identifiers "History-1" to "History-n" are identifiers identifying the records. For example, when the LIU 10 is activated and the current time reaches a time to execute the first monitoring, information on packets transmitted and received within the first monitoring time period t is stored in the identifier "History-1". Then, when the current time reaches a time to execute the second monitoring, information on packets transmitted and received within the second monitoring time period t is stored in a field for the identifier "History-2". After the n-th monitoring is executed, the identifier "History-1" is initialized and information is stored in the field for the identifier "History-1".

The VLAN IDs "VLAN-1" to "VLAN-4096" identify virtual networks and are stored for each of the identifiers "History-1" to "History-n". The flag "EG" indicates an output packet, and the flag "IG" indicates an input packet. The flag "Uni" indicates a packet that is transmitted or received by unicast, and the flag "Mutt" indicates a packet that is transmitted or received by multicast.

The flag "Abs" indicates that a priority specified for a packet is the highest priority. The flag "High" indicates that a priority specified for a packet is the second highest priority. The flag "Mid" indicates that a priority specified for a packet is the third highest priority. The flag "Low" indicates that a priority specified for a packet is the lowest priority.

The flag "p4" indicates that the length of a packet is 1024 bytes. The flag "p3" indicates that the length of a packet is 512 bytes. The flag "p2" indicates that the length of a packet is 256 bytes. The flag "p1" indicates that the length of a packet is 128 bytes. While a value of 1 is set to flags that correspond to a packet, 0 is set to flags that do not correspond to the packet.

For example, it is assumed that a virtual identifier is "VLAN-1" and a packet that has the highest priority set thereto and a length of 512 is received within the second monitoring time period. Based on this assumption, 1 is set to each of the flags "IG", "Abs", and "p3" of "VLAN-1" of "History-2" of the distribution record management table 11b. Specifically, the checkers (described later) 12b to 12e set 1 to flags corresponding to a received packet, while the checkers (described later) 13b to 13e set 1 to flags corresponding to a transmitted packet. Thus, 1 is set to items indicating that a packet has passed through the inside of the LIU 10, while 0 is set to items indicating that a packet does not pass through the inside of the LIU 10. The type of a packet that has passed through the inside of the LIU 10 may be identified.

Returning to FIG. 2, the VLAN table 11c is a table mapped to a predetermined region identified by a VLAN ID and included in the memory. The type table 11d is a table mapped to a predetermined region included in the memory and identified by the flag "Uni" or "Mutt" that indicates the type of a packet. The priority information table 11e is a table mapped to a predetermined region included in the memory and identified by a priority set to the packet. The packet length table 11f is a table mapped to a predetermined region included in the memory and identified by the flag "p1", "p2", "p3", or "p4" indicating the packet length.

Figure 5:
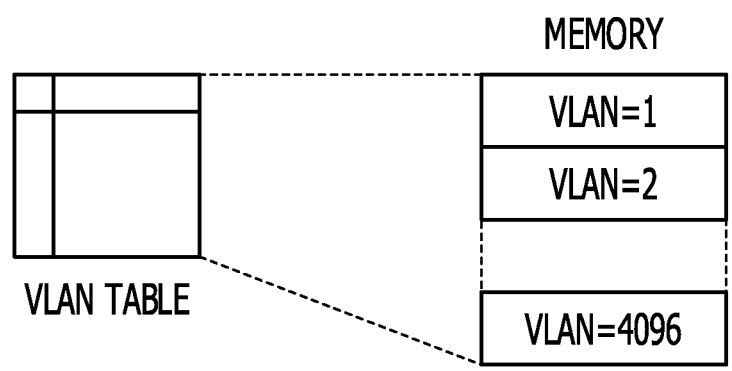
FIG. 5 is a diagram illustrating an example of mapping of a VLAN table to a memory.

An example of the mapping is described with reference to FIG. 5. FIG. 5 is a diagram illustrating the example of the mapping of the VLAN table 11c to the memory. As illustrated in FIG. 5, predetermined regions of the memory are associated with the VLAN table 11c. An entry of the memory may be accessed by accessing a record of the VLAN table 11c. For example, when a record of the VLAN ID "VLAN-2" is read from the VLAN table 11c, an entry that is associated with the VLAN ID "VLAN-2" on the memory may be read.

The input processor 12 includes the input counter 12a, the VLAN checker 12b, the type checker 12c, the priority checker 12d, and the packet length checker 12e. The input processor 12 is a processing part that uses the checkers 12a to 12e to execute various processes on a packet input to the LIU 10. The packet to be processed by the input processor 12 may be a user packet or a monitoring packet.

The input counter 12a is a processing part that counts the number of input packets. For example, when receiving a packet, the input counter 12a increments the number of input packets in the distributed packet number table 11a and the total number of packets in the distributed packet number table 11a. Then, the input counter 12a outputs the received packet to the VLAN checker 12b.

Figure 6:
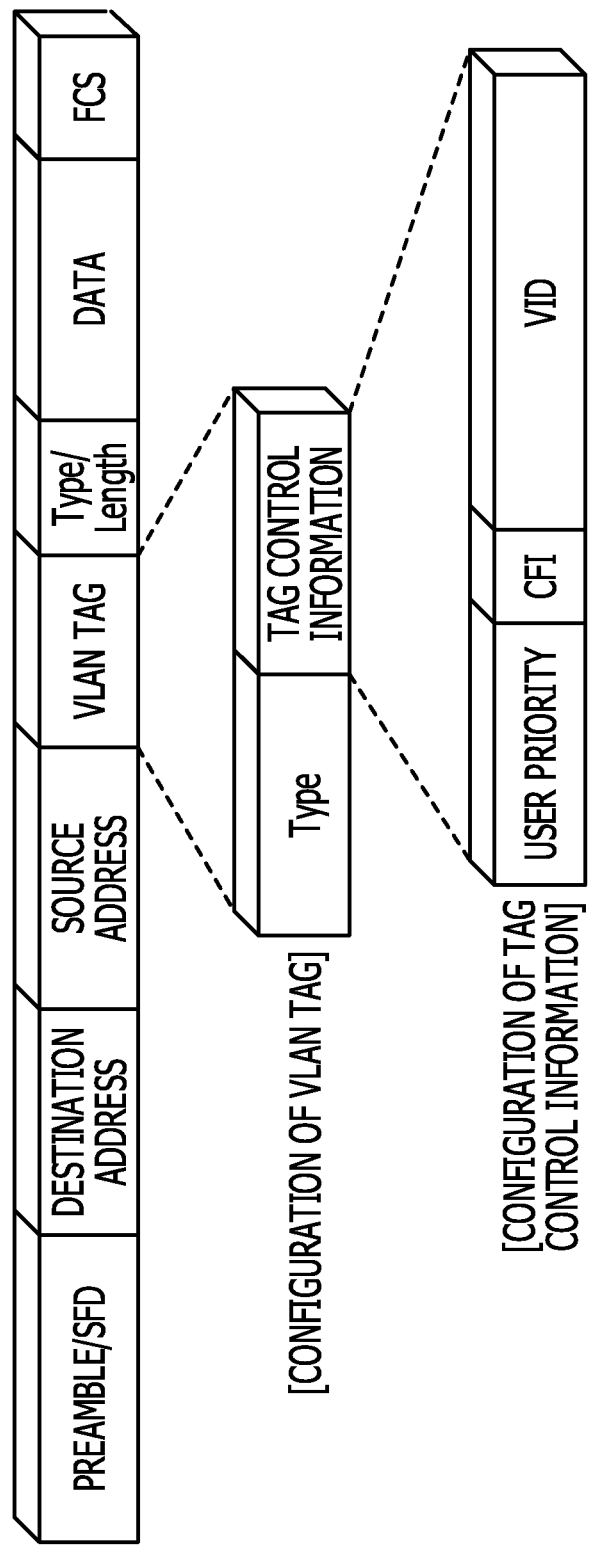
FIG. 6 is a diagram illustrating an example of the format of a packet.

An example of the received packet is described below. FIG. 6 is a diagram illustrating an example of the format of the received packet. The format of the received packet is the same as the format of an output packet. As illustrated in FIG. 6, the packet is configured by fields for a "preamble/start frame delimiter (SFD), a destination address, a source address, a VLAN tag, a type/length, data, and an FCS"

The "preamble/SFD" field is configured by a preamble field of 7 bytes and an SFD field of 1 byte, for example. The "preamble/SFD" field is a field for storing a signal that causes an interface coupled to the network to recognize the start of transmission and gives synchronization timing. The "destination address" is, for example, information of 6 bytes. An Internet Protocol (IP) address that indicates a destination of the packet is set in the "destination address" field. The source address is, for example, information of 6 bytes. An IP address that indicates a source of the packet is set in the "source address" field.

The "VLAN tag" field is a field that stores a "type" field and a "tag control information" field and is of 6 bytes. Information on a VLAN is set in the "VLAN tag" field. The "type" field indicates the type of the packet and is of 2 bytes. If the "type field" indicates "IEEE802.1Q", a value of 8100 is set in the "type" field. The "tag control information" field is of 2 bytes and stores a "user priority" field, a "canonical format indicator" (CFI) field, and a "VID" field. The priority of the packet is set in the "user priority" field. A flag that indicates that the format is Ethernet is set in the "CFI" field. An identifier that identifies a virtual network is set in the "VID" field, and the information set in the "VID" field corresponds to a VLAN ID described above.

An ID that identifies an upper layer protocol set to the "data" field and the length of the packet are set in the "type/length" field. If the packet is a user packet, user data is set in the "data" field. If the packet is a monitoring packet, the "data" field is blank. The "FCS" field is of 4 bytes and used to detect an error of the packet. A cyclic redundancy check (CRC) value that is calculated from the fields for the destination address, the source address, the type/length, and the data is set in the "FCS" field. The same CRC value is set in the output packet. If values of the FCS fields do not match, an error is detected.

The VLAN checker 12b is a processing part that checks an abnormality of a region included in the memory and corresponding to the VLAN ID indicated by the input packet. Specifically, the VLAN checker 12b acquires a value set in the VID field (illustrated in FIG. 6) of the input packet and reads a record associated with the value from the VLAN table 11c. In this case, the VLAN checker 12b executes a parity check upon the reading of the record and checks an error of data in the memory. If the error of data in the memory is detected, the VLAN checker 12b informs the controller 14 and the like that the abnormality is detected.

Figure 7:
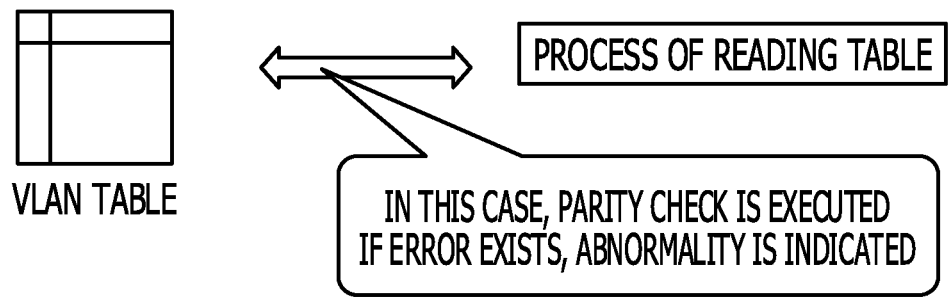
FIG. 7 is a diagram illustrating an example of checking upon access to the VLAN table.

FIG. 7 is a diagram illustrating an example of the checking upon access to the VLAN table 11c. As illustrated in FIG. 7, the VLAN checker 12b executes a parity check upon the reading of the record from the VLAN table 11c. Specifically, the VLAN checker 12b reads an interested entry from the memory by reading the record from the VLAN table 11c. Thus, the VLAN checker 12b may check whether or not an abnormality exists in a memory region corresponding to the VLAN through which the packet passes.

The type checker 12c is a processing part that specifies, on the basis of the destination MAC address field of the input packet, whether the input packet is transmitted by unicast packet or multicast. The type checker 12c checks an abnormality of a region included in the memory and corresponding to the specified information. Specifically, if the destination address field (illustrated in FIG. 6) of the input packet indicates a single destination, the type checker 12c determines that the packet has been transmitted by unicast. If the destination address field (illustrated in FIG. 6) of the input packet indicates multiple destination addresses or a group address, the type checker 12c determines that the input packet has been transmitted by multicast.

Then, the type checker 12c reads a record associated with the specified unicast or multicast from the type table 11d. In this case, the type checker 12c checks an error of data in the memory on the basis of whether the type checker 12c normally reads the interested record. Specifically, the type checker 12c executes a parity check upon the reading of the record from the type table 11d. If the abnormality is detected, the type checker 12c informs the controller 14 and the like that the abnormality is detected.

In this manner, the type checker 12c may read an interested entry from the memory by reading the record from the type table 11d. Thus, the type checker 12c may check whether or not an abnormality exists in a region included in the memory and corresponding to the type of a packet.

The priority checker 12d is a processing part that specifies a priority set to the input packet on the basis of the user priority field of the input packet and checks whether or not an abnormality exists in a region included in the memory and corresponding to the specified priority. Specifically, the priority checker 12d reads a record associated with the specified priority of the input packet from the priority information table 11e. In this case, the priority checker 12d executes the memory abnormality check on the basis of whether the priority checker 12d normally reads the interested record. Specifically, the priority checker 12d executes a parity check upon the reading of the interested record from the priority information table 11e. If the abnormality is detected from the memory, the priority checker 12d informs the controller 14 and the like that the abnormality is detected.

In this manner, the priority checker 12d may read an interested entry from the memory by reading the interested record from the priority information table 11e. Thus, the priority checker 12d may check whether or not an abnormality exists in a memory region corresponding to a priority set to a packet.

The packet length checker 12e is a processing part that specifies the length of the input packet on the basis of the type/length field of the input packet and checks whether or not an abnormality exists in a region included in the memory and corresponding to the specified packet length. Specifically, the packet length checker 12e reads a record associated with the specified length of the input packet from the packet length table 11f. In this case, the packet length checker 12e executes the memory abnormality check on the basis of whether the packet length checker 12e normally reads the interested record. Specifically, the packet length checker 12e executes a parity check upon the reading of the interested record from the packet length table 11f. If the abnormality is detected from the memory, the packet length checker 12e informs the controller 14 and the like that the abnormality is detected.

In this manner, the packet length checker 12e may read an interested entry from the memory by reading the interested record from the packet length table 11f. Thus, the packet length checker 12e may check whether or not an abnormality exists in a memory region corresponding to the length of a packet.

The output processor 13 includes the output counter 13a, the VLAN checker 13b, the type checker 13c, the priority checker 13d, and the packet length checker 13e and uses the parts 13a to 13e to execute various processes on a packet to be output from the LIU 10. The packet that is processed by the output processor 13 may be a user packet or a monitoring packet.

The processes are executed by the processing parts 13a to 13e of the output processor 13 on a packet to be output, unlike the processes that are executed on an input packet by the input processor 12. The contents of the processes that are executed by the output processor 13 are the same as or similar to the processes that are executed by the input processor 12, and a detailed description thereof is omitted. The order in which processing parts that are included in the input or output processor 12 or 13 are arranged is not limited to the order illustrated in FIG. 2 and may be arbitrarily changed. For example, the processing parts may be arranged so that the items are checked in the order from the most important item that largely affects another device, and whereby an important error may be early detected.

The input processor 12 or the output processor 13 may use an FCS or the like to execute the memory abnormality check as well as the checks executed by the checkers (illustrated in FIG. 6). The memory may include a circuit that executes the same processes as the checkers 12a to 12e or 13a to 13e, and the circuit that is included in the memory may execute the checks.

The controller 14 includes a selector 15, a generator 16, and a distributer 17. The controller 14 is a processing part that uses the selector 15, the generator 16, and the distributer 17 to generate a monitoring packet and detect an error of data in the memory using the generated monitoring packet.

The selector 15 is a processing part that selects, from among distribution records stored in the distribution record management table 11b, a combination of items indicating that a packet is not distributed in the LIU 10. Specifically, the selector 15 references distribution records that are from the present to the past and have been stored in the distribution record management table 11b, and specifies a combination of a virtual network of which the amount of distribution records is small, an input and output item, a type, a priority, and a packet length.

For example, the selector 15 calculates logical products of the identifiers History-1 to History-n for each of the VLAN IDs. Specifically, the selector 15 calculates a logical product for each of the flags "EG", "IG", "Uni", "Mult", "Abs", "High", "Mid", "Low" "p1", "p2", "p3", and "p4" of the identifiers History-1 to History-n for each of the VLAN IDs. For example, the selector 15 calculates a formula of ("EG" of VLAN-1|"EG" of VLAN-2|, . . . , |"EG" of VLAN-n).

Then, the selector 15 specifies a combination of logical products of "0" for each of the VLAN IDs. Specifically, the selector 15 specifies items that cause a logical product to be 0 on the basis of an input and output item, a type, a priority, and a packet length for each of the VLAN IDs. For example, for the VLAN ID VLAN-1, it is assumed that the input and output item indicates that "EG=1 and IG=0", the type indicates that "Uni=0 and Mult=1", the priority indicates that "Abs=Mid=Low=0 and High=1", and the packet length indicates that "p1=1 and p2=p3=p4=0". Based on this assumption, the selector 15 specifies "VLAN-1, IG, Mult, High, and p1", and outputs information of the specified combination to the generator 16.

If values of an item are the same or the type indicates that "Uni=Mult=1", the selector 15 may arbitrarily select a combination. If all the items indicate 1, the selector 15 does not select a combination for a VLAN ID corresponding to the items. If multiple VLAN IDs for which a distribution record does not exist are present, the selector 15 may arbitrarily select a combination. For example, the selector 15 may select the smallest VLAN ID or a VLAN ID that has been specified the largest number of times as a combination of items indicating that a packet is not continuously distributed. VLAN IDs to be selected are the IDs of VLANs coupled to the LIU 10. Thus, if the VLANs with IDs VLAN-1 to VLAN-30 are coupled to the LIU 10, the aforementioned process is executed on the VLAN IDs VLAN-1 to VLAN-30.

The generator 16 is a processing part that generates a monitoring packet corresponding to the combination informed by the selector 15. Specifically, the generator 16 generates, on the basis of distribution records from the present to the past, a monitoring packet that is distributed through a path of which the amount of distribution records has been determined to be small.

For example, it is assumed that the selector 15 informs the generator 16 of "VLAN-1, IG, Mult, High, and p1" as a combination for which the amount of distribution records is small. Based on this assumption, the generator 16 generates a monitoring packet in which "a network address of the LIU 10 is set in the destination address field, an IP address of the LIU 10 is set in the source address field, VLAN-1 is set in the VID field, High is set in the user priority field, and p1 that indicates 128 bytes is set in the type/length field". The generator 16 sets the destination address so as to cause the packet to be distributed in the input processor 12 and the output processor 13. Since the informed item indicates "IG", the generator 16 outputs, to the distributer 17, an instruction to cause the generated monitoring packet to be input to the input processor 12.

The generator 16 may change the priority of the generated monitoring packet on the basis of the number of packets input to the LIU 10 or the number of packets output from the LIU 10. Specifically, the generator 16 determines any of Abs, High, Mid, and Low as a priority to be set to the monitoring packet on the basis of the total number of packets that is stored in the distributed packet number table 11a. In this case, if the total number of the packets is equal to or larger than an upper limit, the generator 16 determines that the monitoring packet is not transmitted.

Thus, the monitoring packet may be transmitted without affecting a user packet. For example, while the amount of distributed user packets is significantly large, the highest priority "Abs" may suppress the transmission of the monitoring packet and inhibit the user packets from being delayed. While the amount of distributed user packets is significantly small, the lowest priority "Low" may inhibit the monitoring packet from being transmitted and suppress unwanted discarding of the monitoring packet.

Returning to FIG. 2, the distributer 17 is a processing part that transmits a monitoring packet received from the generator 16 to the input processor 12 and the output processor 13. For example, the distributer 17 transmits a monitoring packet to the specified input processor 12 and receives the monitoring packet from the output processor 13. In this case, the distributer 17 causes information on the transmitted monitoring packet to be stored in the distribution record management table 11b.

For example, it is assumed that the distributer 17 transmits, to the input processor 12, a monitoring packet in which "the network address of the LIU 10 is set in the destination address field, the IP address of the LIU 10 is set in the source address field, VLAN-1 is set in the VID field, High is set in the user priority field, and p1 that indicates 128 bytes is set in the type/length field". Based on this assumption, the distributer 17 sets, to 1, the flags High, p1, IG, and Mult of the VLAN ID VLAN-1 of an identifier History corresponding to the current monitoring timing. Specifically, the distributer 17 transmits the monitoring packet through a path that has no distribution record until the monitoring packet is transmitted. Then, the distributer 17 treats the path as a path through which a packet has been distributed.

If the distributer 17 receives a transmitted monitoring packet, the distributer 17 determines that an abnormality does not exist in the memory in a path through which the monitoring packet has been distributed. Then, the distributer 17 discards the received monitoring packet. If the distributer 17 does not receive the transmitted monitoring packet, the distributer 17 determines that an abnormality exists in the memory in the path through which the monitoring packet has been distributed. In this case, the distributer 17 inquires of the checkers 12b to 12e and 13b to 13e or detects the error of data in the memory on the basis of a notification provided by at least one of the checkers 12b to 12e and 13b to 13e and indicating the abnormality. The distributer 17 informs the transmitting device provided with the LIU 10 of information of the detected error of data in the memory. The information of the error of data in the memory is, for example, the time when the abnormality occurs, information of a memory entry to which the abnormality occurs, information of an item that causes the abnormality, or the like. The item information is an item from which an error is detected by the parity check executed upon the reading of the memory. The item information is, for example, a VLAN ID.

Flows of Processes

Next, a process of transmitting a monitoring packet by the LIU 10 and a process of determining transmission of a monitoring packet are described. The process of determining transmission of a monitoring packet is executed in the process of transmitting the monitoring packet.

Process of Transmitting Monitoring Packet

Figure 8:
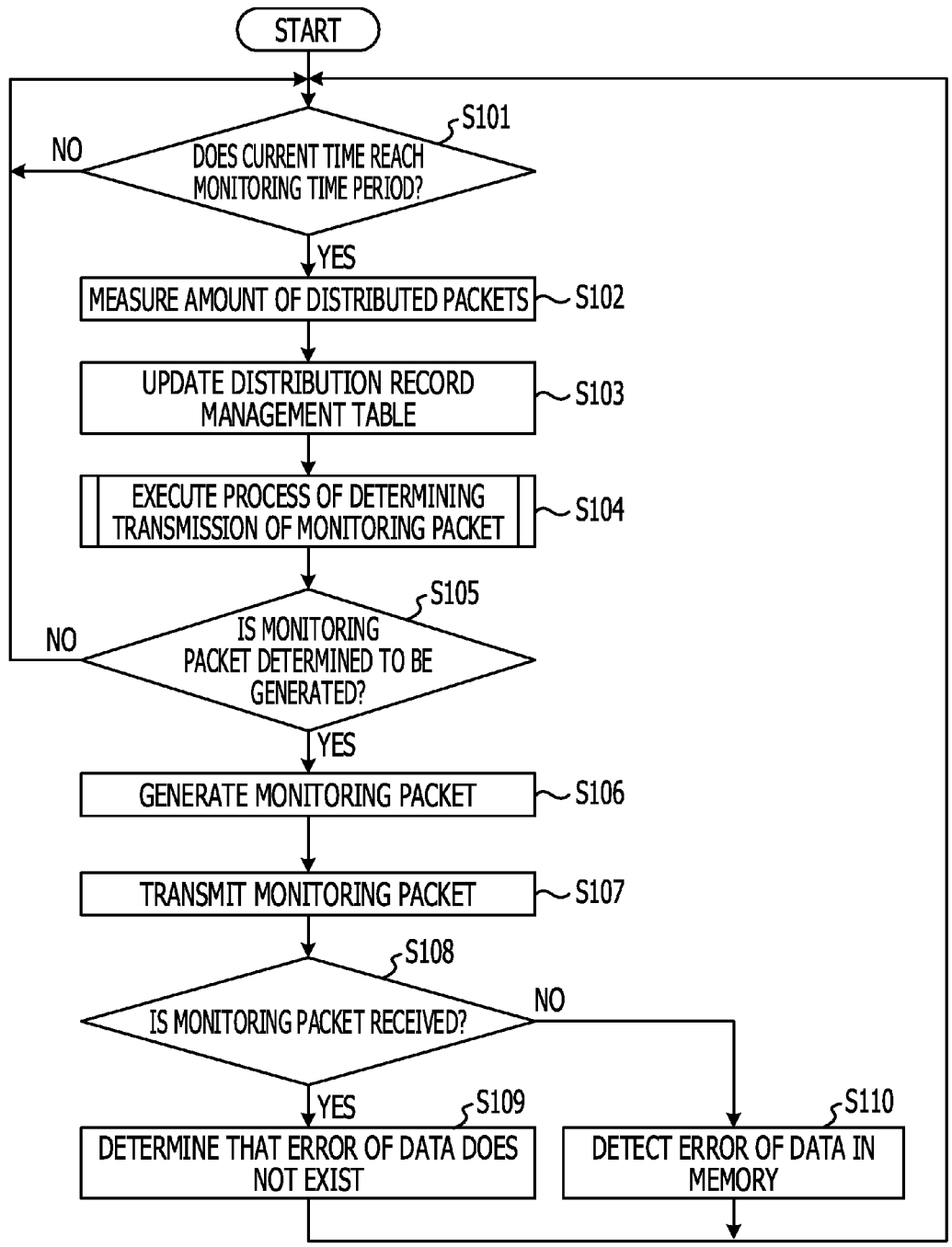
FIG. 8 is a flowchart of a process of transmitting a monitoring packet.

FIG. 8 is a flowchart of the process of transmitting a monitoring packet. As illustrated in FIG. 8, when the current time reaches a monitoring time period (Yes in S101), the input counter 12a of the input processor 12 and the output counter 13a of the output processor 13 measure the amount of distributed packets (in S102). Specifically, the LIU 10 measures the number of input packets, the number of output packets, and the total number of the input and output packets.

Subsequently, the checkers 12b to 12e of the input processor 12 and the checkers 13b to 13e of the output processor 13 update the distribution record management table 11b (in S103). Specifically, the checkers 12b to 12e and 13b to 13e check whether or not an abnormality exists in the memory in order to cause a received packet to pass through the LIU 10. Then, the checkers 12b to 12e and 13b to 13e set, to 1, flags associated with checked items and managed in the distribution record management table 11b.

After that, the process of determining transmission of a monitoring packet is executed (in S104). If the generator 16 determines that the monitoring packet is not generated (No in S105), the LIU 10 executes the processes of S101 and later for the next monitoring time period.

If the generator 16 determines that the monitoring packet is generated (Yes in S105), the generator 16 generates the monitoring packet to be transmitted through a path that has been selected by the selector 15 and of which the amount of distribution records is small (in S106). Then, the distributer 17 transmits the generated monitoring packet (in S107). Specifically, the distributer 17 distributes the monitoring packet to the output processor 12 and the output processor 13.

When receiving the monitoring packet (Yes in S108), the distributer 17 determines that an error of data does not exist in the memory (in S109). In this case, the distributer 17 updates the distribution record management table 11b due to the record of the distribution of the monitoring packet.

If the distributer 17 does not receive the monitoring packet (No in S108), the distributer 17 detects an error of data in the memory (in S110). In this case, the distributer 17 updates the distribution record management table 11b due to the record of the distribution of the monitoring packet. After termination of S109 or S110, the processes of S101 and later are executed for the next monitoring time period.

Process of Determining Transmission of Monitoring Packet

Figure 9:
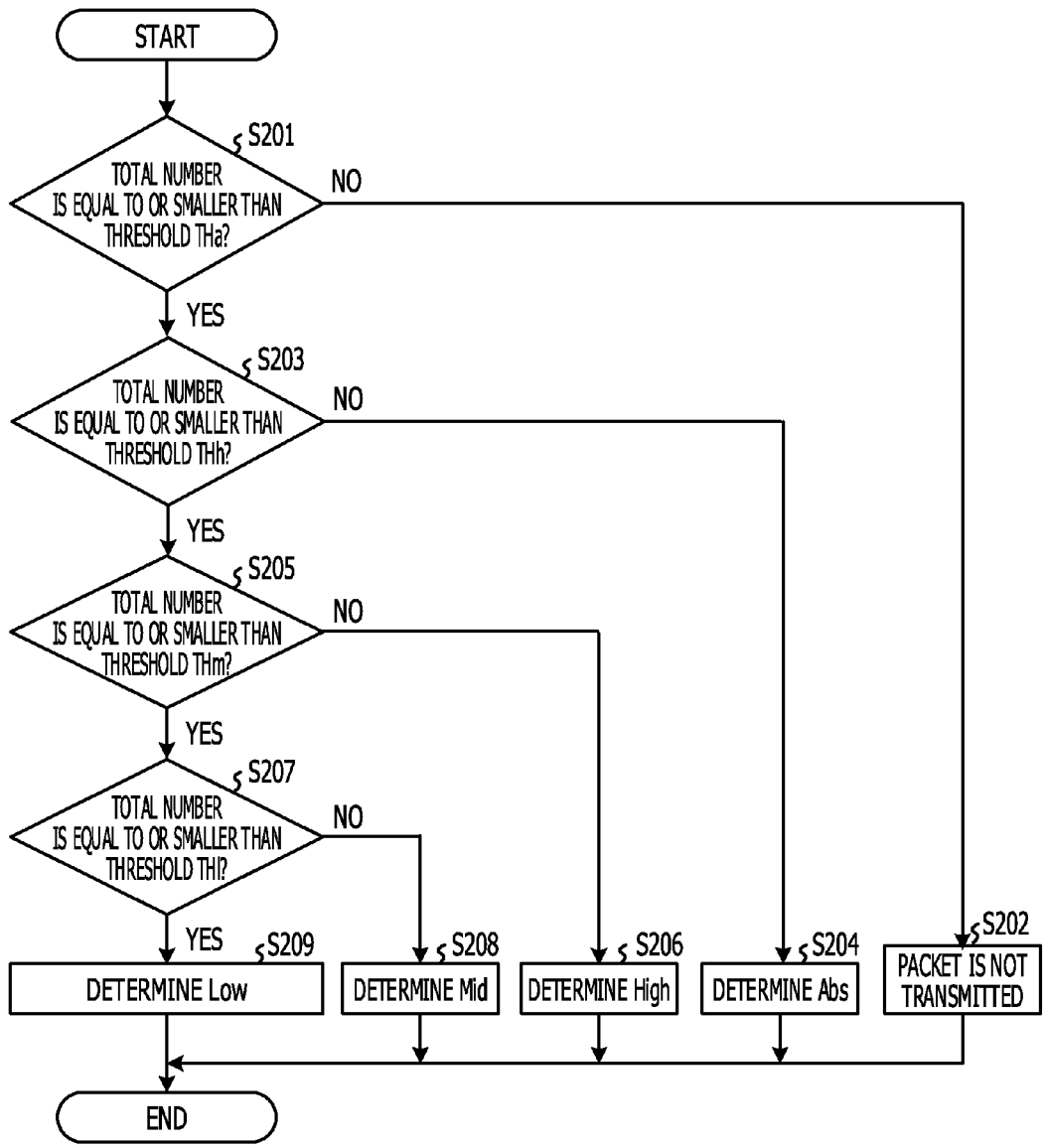
FIG. 9 is a flowchart of a process of determining the transmission of the monitoring packet.

FIG. 9 is a flowchart of the process of determining transmission of the monitoring packet. This process is executed in S104 illustrated in FIG. 8. It is assumed that thresholds THa, THh, THm, and THl that are used in the process illustrated in FIG. 9 have a relationship of THa>THh>THm>THl.

As illustrated in FIG. 9, when the total number of input and output packets is larger than the threshold THa (No in S201), the generator 16 determines that the monitoring packet is not transmitted (in S202). Specifically, the generator 16 determines whether or not the total number of the packets that is stored in the distributed packet number table 11a is equal to or smaller than the threshold THa. If the total number of the packets is larger than the threshold THa, the generator 16 determines that the amount of distributed user packets is large and that the probability that the user packets are delayed is high. Then, the generator 16 does not transmit the monitoring packet.

If the total number of the input and output packets is equal to or smaller than the threshold THa (Yes in S201), the generator 16 determines whether or not the total number of the input and output packets is equal to or smaller than the threshold THh (in S203).

If the total number of the input and output packets is larger than the threshold THh (No in S203), the generator 16 determines Abs as the priority (in S204). Specifically, since the amount of the distributed user packets is large but equal to or smaller than the upper limit, the generator 16 causes the monitoring packet to be less likely to affect the user packets and determines Abs as the priority that does not cause the monitoring packet to be discarded.

If the total number of the input and output packets is equal to or smaller than the threshold THh (Yes in S203), the generator 16 determines whether or not the total number of the input and output packets is equal to or smaller than the threshold THm (in S205).

If the total number of the input and output packets is larger than the threshold THm (No in S205), the generator 16 determines High as the priority (in S206). Specifically, the generator 16 determines that even when the priority is High, the monitoring packet is less likely to affect the user packets due to the amount of the currently distributed user packets and is not discarded.

If the total number of the input and output packets is equal to or smaller than the threshold THm (Yes in S205), the generator 16 determines whether or not the total number of the input and output packets is equal to or smaller than the threshold THl (in S207).

If the total number of the input and output packets is larger than the threshold THl (No in S207), the generator 16 determines Mid as the priority (in S208). Specifically, the generator 16 determines that even when the priority is Mid, the monitoring packet is less likely to affect the user packets due to the amount of the currently distributed user packets and is not discarded.

If the total number of the input and output packets is equal to or smaller than the threshold THl (Yes in S207), the generator 16 determines Low as the priority (in S209). Specifically, the generator 16 determines that even when the priority is Low, the monitoring packet is not discarded. If the total number of the input and output packets is equal to or smaller than the threshold THl, and the priority is Low, the monitoring packet is not discarded, and the generator 16 may set the priority selected by the selector 15 to the monitoring packet.

Specific Example

Figure 10:
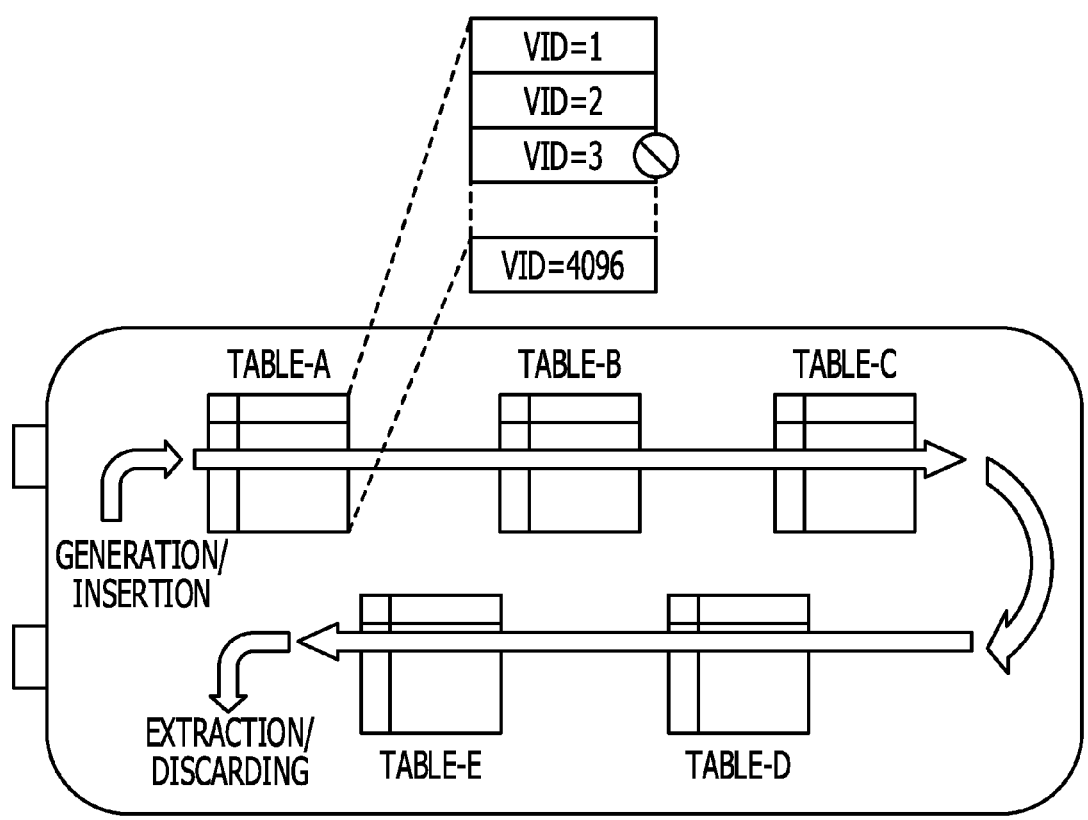
FIG. 10 is a diagram illustrating a specific example in which a monitoring packet is distributed in the LIU using a memory.

FIG. 10 is a diagram illustrating a specific example in which a monitoring packet is distributed in the LIU 10 using the memory. As illustrated in FIG. 10, when the memory receives the monitoring packet, the LIU 10 accesses tables Table-a, Table-b, Table-c, Table-d, and Table-e associated with predetermined regions of the memory and determines whether or not an abnormality exists in the memory. Specifically, the LIU 10 may execute a reading process on a table corresponding to a path of the monitoring packet, thereby access the memory, and detect an error of data in the memory.

If an abnormality does not exist in the memory, the LIU 10 may read a record of the corresponding table and thus may receive the monitoring packet that has accessed the tables. Then, the LIU 10 discards the monitoring packet in the LIU 10 without transmitting the monitoring packet to the outside of the LIU 10. If an abnormality exists in the memory, the LIU 10 does not read a record of a table having the abnormality and receive the transmitted packet. The LIU 10 may confirm a memory region in which the abnormality exists by confirming a table by which the packet is stopped.

Effects

As described above, since the configuration of the monitoring packet is dynamically changed, the LIU 10 may detect an abnormality that has not been traditionally detected without a distribution of a user packet, or the LIU 10 may detect a silent failure in advance. The LIU 10 calculates the total amount of packets, determines whether to distribute a monitoring packet, and thereby inhibits a user packet from being discarded due to the distribution of the monitoring packet.

The specific example is described below with reference to FIG. 10. As illustrated in FIG. 10, the table Table-a is associated with a predetermined region of the memory. In order to distribute a user packet with a "VID of 1" or "VLAN-1" within the LIU 10, the LIU 10 accesses the "VID of 1" in the table Table-a. Similarly, in order to distribute a monitoring packet with a "VID of 4096" or "VLAN-4096" within the LIU 10, the LIU 10 accesses the "VID of 4096" in the table Table-a.

Each time a conventional LIU sets the "VLAN-4096" to a monitoring packet, the conventional LIU determines whether or not an abnormality exists in the memory using the monitoring packet having the "VLAN-4096" set thereto. Thus, if the VLAN-3 has an abnormality, the conventional LIU may not detect the abnormality. On the other hand, the LIU 10 according to the first embodiment may generate a monitoring packet to be transmitted through a path of which the amount of distribution records is small for each of monitoring packets. Thus, the LIU 10 may change a path of a monitoring packet for each of monitoring packets and early detect the aforementioned abnormality of the VLAN-4096 in the memory, compared with the conventional LIU.

Second Embodiment

The first embodiment is described above, and the technique disclosed herein may be achieved in another embodiment. The other embodiment is described below.

Distribution Records

The first embodiment describes the example in which the VLAN IDs identifying the virtual networks, the destination information indicating whether a packet is transmitted by unicast or multicast, the priority information indicating the priority of the packet, the information indicating the length of the packet, and the directional information indicating transmission or reception of the packet are stored as distribution records. The distribution records are not limited to the information. Only arbitrary information may be stored as the distribution records. In this case, since the virtual networks are formed for customers in many cases, the VLAN-IDs are preferably included. The packet lengths and priorities, which are described in the first embodiment, are examples and not limited to the values and levels described in the first embodiment.

Selection of Monitoring Packet

The example in which the LIU 10 according to the first embodiment stores, as a distribution record, a path through which a packet has been distributed in the LIU 10 is described above. The LIU 10, however, is not limited to this. The LIU 10 may store the number of times when a packet is distributed in the LIU 10. The first embodiment describes the example in which whether or not a packet is distributed in the LIU 10 is specified using the flag for the item EG illustrated in FIG. 4 and the like. The LIU 10 may store the number of times when a packet is distributed in the LIU 10 for the item EG illustrated in FIG. 4 and the like.

For example, the LIU 10 specifies a path that is identified by a VLAN ID and through which the smallest number of packets have been distributed. Then, the LIU 10 generates a monitoring packet to be transmitted through the specified path identified by the VLAN ID. The LIU 10 may specify a path that is identified by a VLAN ID and through which packets of which the number is equal to or smaller than an arbitrary threshold have been distributed. Thus, the LIU 10 may monitor the number of distributed packets for each of paths and thereby intensively monitor a specific path.

Transmission System

All or a part of the processes that are among the processes described in the embodiments and are automatically executed may be manually executed. All or a part of the processes that are among the processes described in the embodiments and are manually executed may be automatically executed by a known method. The process procedures, control procedures, specific names, and information including various types of data and parameters are described in this specification and illustrated in the drawings and may be arbitrarily changed unless otherwise specified.

The constituent elements of the devices illustrated in the drawings are functionally conceptual and may not be physically configured as illustrated in the drawings. The separations and integrations of the devices are not limited to those illustrated in the drawings. Specifically, all or a part of the devices may be functionally or physically separated or integrated on an arbitrary basis on the basis of loads applied to the devices and usage statuses of the devices. In addition, all or a part of the processing functions of the devices may be achieved by a CPU or a program to be analyzed and executed by the CPU, or may be achieved as hardware by a wired logic.

Hardware

Figure 11:
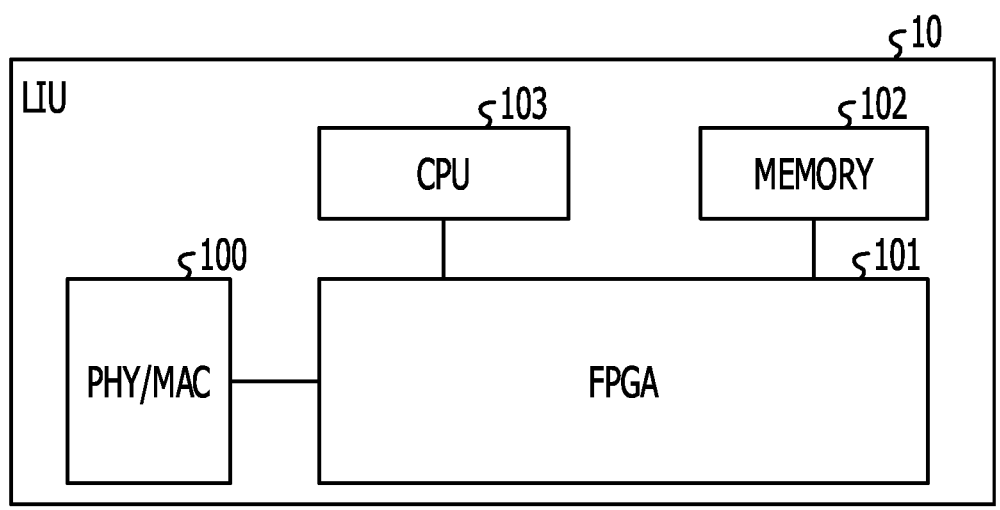
FIG. 11 is a diagram illustrating an example of a hardware configuration of the LIU.

FIG. 11 is a diagram illustrating an example of a hardware configuration of the LIU 10. As illustrated in FIG. 11, the LIU 10 includes a physical layer (PHY)/media access control address (MAC) 100, a field-programmable gate array (FPGA) 101, a memory 102, and a central processing unit (CPU) 103. The hardware illustrated in FIG. 11 is an example and may be other hardware.

The PHY/MAC 100 is hardware that controls communication between the LIU 10 and another device in the physical layer. The FPGA 101 is hardware that accesses an entry included in the memory 102 and corresponding to a packet and detects an error of data in the memory 102 upon a distribution of the packet. For example, the FPGA 101 corresponds to the input processor 12 and the output processor 13 and has a circuit that executes the same processes as the checkers 12b to 12e and 13b to 13e included in the input and output processors 12 and 13.

The memory 102 is a storage unit that stores tables and data. For example, the memory 102 corresponds to the storage unit 11 illustrated in FIG. 2 and stores the tables stored in the storage unit 11. The memory 102 may be arranged outside the LIU 10 instead of being arranged in the LIU 10. The tables may be stored in an internal memory of the FPGA 101.

The CPU 103 is hardware that controls all the processes to be executed in the LIU 10. For example, the CPU 103 corresponds to the controller 14 illustrated in FIG. 2 and executes the same processes as the selector 15, the generator 16, and the distributer 17. The CPU 103 may read, from the memory 102 or the like, a program causing the same processes as the selector 15, the generator 16, and the distributer 17 to be executed, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting device located between a plurality of external devices and coupled to the plurality of external devices via a plurality of virtual networks and configured to transmit a user packet communicated between the plurality of external devices, the transmitting device comprising:
- a memory configured to have a plurality of memory regions respectively assigned to one of the plurality of virtual networks, wherein a memory region, among the plurality of memory regions, that is assigned to a virtual network over which the user packet is transmitted among the plurality of virtual networks, is accessed when the user packet is transmitted using the virtual network; and
- a processor coupled to the memory and configured to:
  - acquire a total value of flow amounts of the user packet transmitted over the plurality of virtual networks by measuring, for each of the plurality of virtual networks, a flow amount of the user packet,
  - determine whether to transmit a monitoring packet to one of the plurality of virtual networks by comparing the total value with a threshold,
  - select, from among the plurality of virtual networks, a virtual network corresponding to a flow amount which is smaller than a predetermined lower limit value among the flow amounts acquired for the plurality of virtual networks, when it is determined to transmit the monitoring packet to one of the plurality of virtual networks,
  - generate the monitoring packet to be transmitted only over the selected virtual network, the monitoring packet including an identifier that identifies the selected virtual network,
  - access the memory region assigned to the selected virtual network based on the identifier that identifies the selected virtual network included in the monitoring packet, and
  - detect an error of the memory region assigned to the selected virtual network using the monitoring packet,
  - wherein the identifier is represented by a numerical value, and
  - when multiple virtual networks of which flow amounts are respectively smaller than the predetermined lower limit value are present, the processor is configured to select a virtual network corresponding to the identifier which is smallest among identifiers of the multiple virtual networks.

2. The transmitting device according to claim 1, wherein the processor is further configured to:
- acquire, for each of the plurality of virtual networks, packet information including type information indicating whether a packet is transmitted by unicast or multicast, directional information indicating whether the packet is input to or output from the transmitting device, priority information indicating a priority of the packet, and a length of the packet, the packet information being measured and accumulated according to a predetermined time interval, and
- store, in association with a plurality of identifiers respectively identifying one of the plurality of virtual networks, the acquired packet information in the memory.

3. The transmitting device according to claim 2, wherein the processor is further configured to:
- generate, for each of measuring timings according to the predetermined time interval, flag information provided for each of the plurality of identifiers, the type information, the directional information, the priority information, and the packet length, the flag information indicating whether the packet is distributed in the transmitting device,
- store a plurality of flag information generated by the processor in the memory,
- calculate a logical product of the plurality of flag information for each of the plurality of identifiers, and
- select the virtual network corresponding to the flow amount which is smaller than the predetermined lower limit value based on the calculated logical product.

4. The transmitting device according to claim 1, wherein the memory includes an error detection circuit, and
the processor is configured to detect the error of the memory region assigned to the selected virtual network by executing a parity check on the memory using the error detection circuit.

5. The transmitting device according to claim 1, wherein the processor is further configured to:
- acquire the flow amounts by counting an input number of packets input to the transmitting device or an output number of packets output from the transmitting device, and
- determine a priority of the monitoring packet by comparing the input or output number of packets with a plurality of thresholds of which levels are different from each other.

6. The transmitting device according to claim 5, wherein the memory stores, as priority information, a flag indicating a level of the priority.

7. The transmitting device according to claim 5, wherein when the input or output number of the packets is equal to or larger than a predetermined number that is a highest level among the plurality of thresholds, the processor determines that the monitoring packet is not transmitted.

8. The transmitting device according to claim 1, wherein the processor is further configured to suppress generating of a monitoring packet which is not identified by the selected virtual network.

9. The transmitting device according to claim 1, wherein the processor is further configured to:
- determine that the error of the memory region is not detected when the monitoring packet is received via the selected virtual network,
- discard the received monitoring packet, and
- determine that the error of the memory region is detected when the monitoring packet is not received via the selected virtual network.

10. The transmitting device according to claim 1, wherein the processor is further configured to:
- select, from among the plurality of virtual networks a virtual network corresponding to a flow amount which is a lowest among the flow amounts.

11. A transmitting device located between a plurality of external devices and coupled to the plurality of external devices via a plurality of virtual networks and configured to transmit a user packet communicated between the plurality of external devices, the transmitting device comprising:
- a memory configured to have a plurality of memory regions respectively assigned to one of the plurality of virtual networks, wherein a memory region, among the plurality of memory regions, that is assigned to a virtual network over which the user packet is transmitted among the plurality of virtual networks, is accessed when the user packet is transmitted using the virtual network; and
- a processor coupled to the memory and configured to:
  - acquire a total value of flow amounts of the user packet transmitted over the plurality of virtual networks by measuring, for each of the plurality of virtual networks, a flow amount of the user packet,
determine whether to transmit a monitoring packet to one of the plurality of virtual networks by comparing the total value with a threshold,
select, from among the plurality of virtual networks, a virtual network corresponding to a flow amount which is smaller than a predetermined lower limit value among the flow amounts acquired for the plurality of virtual networks, when it is determined to transmit the monitoring packet to one of the plurality of virtual networks,
generate the monitoring packet to be transmitted only over the selected virtual network, the monitoring packet including an identifier that identifies the selected virtual network,
access the memory region assigned to the selected virtual network based on the identifier that identifies the selected virtual network included in the monitoring packet,
detect an error of the memory region assigned to the selected virtual network using the monitoring packet,
determine whether the total value is equal to or lower than a first threshold,
suppress transmitting the monitoring packet, when determining that the total value is not equal to or lower than a first threshold,
determine whether the total value is equal to or lower than a second threshold which is lower than the first threshold, when determining that the total value is equal to or lower than a first threshold,
assign a first priority level to the monitoring packet, when determining that the total value is not equal to or lower than the second threshold,
determine whether the total value is equal to or lower than a third threshold which is lower than the second threshold, when determining that the total value is equal to or lower than the second threshold, and
assign a second priority level which is lower than the first priority level to the monitoring packet, when determining that the total value is not equal to or lower than the second threshold.

* * * * *